US012032781B1

(12) United States Patent
Cheng et al.

(10) Patent No.: US 12,032,781 B1
(45) Date of Patent: Jul. 9, 2024

(54) TOUCH DEVICE AND METHOD WITH SCAN ORDER OF CONNECTION AREAS ACCORDING TO HIT AREA WHERE STYLUS IS LOCATED

(71) Applicant: Novatek Microelectronics Corp., Hsinchu (TW)

(72) Inventors: Yen-Cheng Cheng, Hsinchu (TW); Ko Ho Lin, Hsinchu (TW); Shih-Chan Huang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/183,893

(22) Filed: Mar. 14, 2023

(51) Int. Cl.
*G06F 3/041* (2006.01)
*G06F 3/0354* (2013.01)

(52) U.S. Cl.
CPC ...... *G06F 3/04166* (2019.05); *G06F 3/03545* (2013.01); *G06F 3/04162* (2019.05)

(58) Field of Classification Search
CPC ............. G06F 3/04166; G06F 3/04162; G06F 3/03545
See application file for complete search history.

(56) References Cited

U.S. PATENT DOCUMENTS

| | | | |
|---|---|---|---|
| 9,367,168 B2 | 6/2016 | Ahn et al. | |
| 11,294,490 B2 | 4/2022 | Chung | |
| 11,625,121 B2 | 4/2023 | Cheng et al. | |
| 2011/0037727 A1 | 2/2011 | Lee et al. | |
| 2012/0262411 A1 | 10/2012 | Ahn et al. | |
| 2017/0308186 A1* | 10/2017 | Yamamoto | G06F 3/041 |
| 2018/0113523 A1* | 4/2018 | Hara | G06F 3/04162 |
| 2018/0113559 A1* | 4/2018 | Bae | G06F 3/03545 |
| 2020/0026369 A1* | 1/2020 | Hisano | G06F 3/0317 |
| 2021/0124449 A1 | 4/2021 | Jang et al. | |
| 2021/0200356 A1 | 7/2021 | Chung | |
| 2021/0333975 A1* | 10/2021 | Miyamoto | G06F 3/03545 |
| 2021/0397297 A1* | 12/2021 | Ding | G06F 3/0443 |

(Continued)

FOREIGN PATENT DOCUMENTS

| | | |
|---|---|---|
| CN | 112905047 | 6/2021 |
| CN | 113050818 | 6/2021 |

(Continued)

OTHER PUBLICATIONS

"Office Action of Taiwan Counterpart Application", issued on Dec. 26, 2023, p. 1-p. 7.

*Primary Examiner* — Liliana Cerullo
(74) *Attorney, Agent, or Firm* — JCIPRNET

(57) ABSTRACT

The disclosure provides a touch device and an operation method thereof. A touch panel of the touch device is divided into a plurality of stylus connection areas. During a first discovery period, the stylus connection areas detect a stylus one by one in a first scan order. When the stylus is located in one of the stylus connection areas (a hit area), the first discovery period is ended to enter a normal period, and the hit area establishes a connection to the stylus. When the connection between the stylus and the touch panel is interrupted, the normal period is ended to enter a second discovery period, and the first scan order is adjusted to a second scan order according to the hit area in the normal period. During the second discovery period, the stylus connection areas detect the stylus one by one in the second scan order.

26 Claims, 4 Drawing Sheets

(56) References Cited

U.S. PATENT DOCUMENTS

2022/0334701 A1   10/2022  Cheng et al.
2022/0382433 A1* 12/2022  Nomura .............. G06F 3/04166

FOREIGN PATENT DOCUMENTS

| CN | 114860116 | 8/2022 |
|----|-----------|--------|
| TW | 200941314 | 10/2009 |
| TW | I552058 | 10/2016 |
| TW | 202240351 | 10/2022 |

* cited by examiner

TOUCH DEVICE AND METHOD WITH SCAN ORDER OF CONNECTION AREAS ACCORDING TO HIT AREA WHERE STYLUS IS LOCATED

BACKGROUND OF THE INVENTION

Technical Field

The disclosure relates to an electronic device, and particularly relates to a touch device and an operation method thereof.

Description of Related Art

A touch panel communicates with an active pen via an uplink signal and a downlink signal to establish a connection. The mode in which the touch panel finds the position of the active pen is called discovery mode. The touch panel detects the position of the active pen in the discovery mode. When the active pen is found and the touch panel establishes a connection with the active pen, the touch panel ends the discovery mode to enter a normal mode to track the position of the active pen. When the connection between the active pen and the touch panel is interrupted, the normal mode is ended to enter the discovery mode again to detect the position of the active pen again. How to quickly detect the position of the active pen again is one of many technical issues in the art.

SUMMARY

The disclosure provides a touch device and an operation method thereof to quickly detect the position of a stylus on a touch panel.

In an embodiment of the disclosure, the touch device includes a touch panel and a driving circuit. The touch panel is divided into a plurality of stylus connection areas. The driving circuit is coupled to the touch panel. The driving circuit enables the stylus connection areas one by one in a first scan order to detect a position of a stylus at the touch panel during a first discovery period. When the stylus is located in a hit area among the stylus connection areas, the first discovery period is ended to enter a normal period, and the driving circuit enables the hit area to establish a connection to the stylus. The driving circuit adjusts the first scan order to a second scan order according to the hit area establishing the connection to the stylus during the normal period. When the connection between the stylus and the touch panel is interrupted, the normal period is ended to enter a second discovery period. The driving circuit enables the stylus connection areas one by one in the second scan order to detect the position of the stylus at the touch panel during the second discovery period.

In an embodiment of the disclosure, the operation method includes: dividing a touch panel of the touch device into a plurality of stylus connection areas; enabling the stylus connection areas one by one in a first scan order to detect a position of a stylus at the touch panel during a first discovery period; ending the first discovery period to enter a normal period and enabling a hit area to establish a connection to the stylus when the stylus is located in the hit area among the stylus connection areas; adjusting the first scan order to a second scan order according to the hit area establishing the connection to the stylus during the normal period; ending the normal period to enter a second discovery period when the connection between the stylus and the touch panel is interrupted; and enabling the stylus connection areas one by one in the second scan order to detect the position of the stylus at the touch panel during the second discovery period.

Based on the above, in order to reduce the power consumption generated during the connection between the touch panel and the stylus, the touch panel of the touch device of an embodiment of the disclosure may be divided into the plurality of stylus connection areas to perform local scan. The driving circuit enables the stylus connection areas one by one in the first scan order to detect the position of the stylus during the first discovery period. When the stylus successfully establishes a connection with a certain stylus connection area (a hit area), the first discovery period is ended to enter the normal period. During the normal period, the driving circuit enables the hit area to track the position of the stylus, and the driving circuit disables other stylus connection areas (non-hit areas) to reduce power consumption. The driving circuit may adjust the first scan order to the second scan order according to the hit area in the normal period. When the connection between the stylus and the touch panel is interrupted, the normal period is ended to enter the second discovery period to detect the position of the stylus again. The driving circuit enables the stylus connection areas one by one in the second scan order to detect the position of the stylus at the touch panel during the second discovery period. Since the second scan order is related to the hit area in the normal period, the driving circuit may quickly detect the position of the stylus on the touch panel again.

In order to make the aforementioned features and advantages of the disclosure more comprehensible, embodiments accompanied with figures are described in detail below.

DESCRIPTION OF THE EMBODIMENTS

Figure 1:
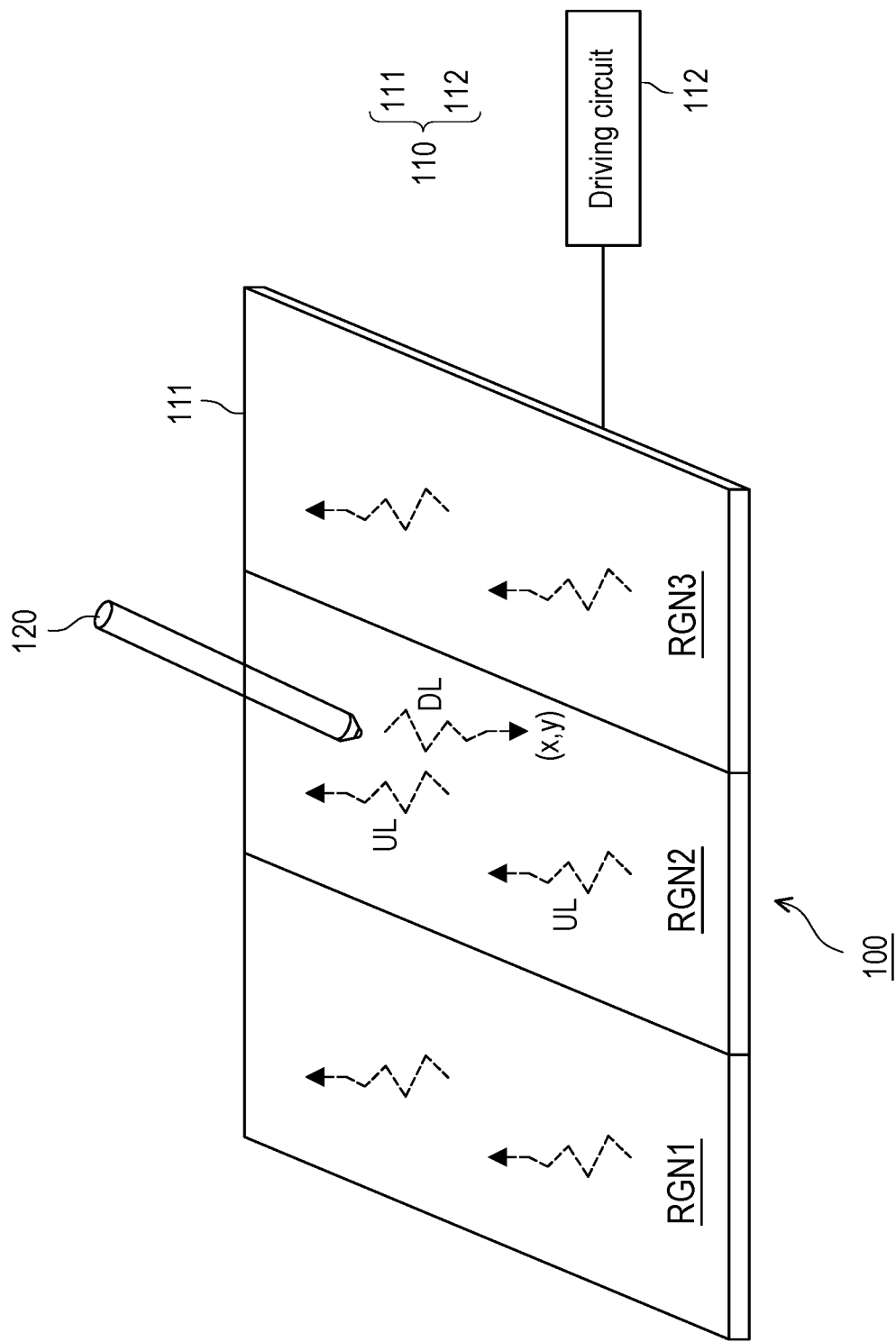
FIG. 1 is a schematic circuit block diagram of a touch system shown according to an embodiment of the disclosure.

The term "coupled to (or connected to)" used in the entire text of the specification of the present application (including claims) may refer to any direct or indirect connecting means. For example, if the text describes a first device is coupled to (or connected to) a second device, then it should be understood that the first device may be directly connected to the second device, or the first device may be indirectly connected to the second device via other devices or certain connecting means. Terms such as "first" and "second" mentioned in the entire specification of the present application (including the claims) are used to name the elements or to distinguish different embodiments or ranges, and are not used to restrict the upper or lower limits of the number of elements, nor are they used to limit the order of the elements. Moreover, when applicable, elements/members/steps having the same reference numerals in figures and embodiments represent the same or similar parts. Elements/members/steps having the same reference numerals or having the same terminology in different embodiments may be cross-referenced.

FIG. 1 is a schematic circuit block diagram of a touch system 100 shown according to an embodiment of the disclosure. The touch system 100 shown in FIG. 1 includes a touch device 110 and a stylus 120. Based on actual design, the touch device 110 may be implemented as a smart phone, a tablet computer, a notebook computer, a display, or other electronic equipment. The touch device 110 includes a touch panel 111 and a driving circuit 112. The touch panel 111 may detect a touch event. When the stylus 120 is located above the touch panel 111, the driving circuit 112 may send an uplink signal UL to the stylus 120 via the touch panel 111, and the driving circuit 112 may receive a downlink signal DL sent by the stylus 120 via the touch panel 111 to perform a stylus detection operation. Accordingly, the user may operate the stylus 120 to write on the touch panel 111.

According to different designs, in some embodiments, the driving circuit 112 may be implemented as a hardware circuit. In some other embodiments, the driving circuit 112 may be implemented as firmware, software (program), or a combination of the two. In some other embodiments, the driving circuit 112 may be implemented as a combination of hardware, firmware, and software. In terms of hardware, the driving circuit 112 may be implemented as a logic circuit on an integrated circuit. For example, the related functions of the driving circuit 112 may be implemented in one or a plurality of controllers, microcontrollers, microprocessors, application-specific integrated circuits (ASICs), digital signal processors (DSPs), field-programmable gate arrays (FPGAs), central processing units (CPUs), and/or various logic blocks, modules, and circuits in other processing units. The related functions of the driving circuit 112 may be implemented as a hardware circuit by using a hardware description language (such as Verilog HDL or VHDL) or other suitable programming languages, such as various logic blocks, modules, and circuits in an integrated circuit.

In software form and/or firmware form, the related functions of the driving circuit 112 may be implemented as a programming code. For example, the driving circuit 112 is implemented by using a common programming language (e.g., C, C++, or assembly language) or other suitable programming languages. The programming code may be recorded/stored in a "non-transitory machine-readable storage medium". In some embodiments, the non-transitory machine-readable storage medium includes, for example, a semiconductor memory and/or a storage device. The semiconductor memory includes a memory card, a read-only memory (ROM), a flash memory, a programmable logic circuit, or other semiconductor memories. The storage device includes a tape, a disk, a hard disk drive (HDD), a solid-state drive (SSD), or other storage devices. An electronic equipment (such as a computer, a CPU, a controller, a microcontroller, or a microprocessor) may read and execute the programming code from the non-transitory machine-readable storage medium, so as to implement the related functions of the driving circuit 112. Alternatively, the programming code may be provided to the electronic equipment via any transmission medium (such as a communication network or broadcast waves, etc.) The communication network is, for example, the Internet, a wired communication network, a wireless communication network, or other communication media.

In order to reduce the power consumption generated during the connection between the touch panel 111 and the stylus 120, the touch panel 111 may be divided into a plurality of stylus connection areas to perform local scan. Taking FIG. 1 as an example, the touch panel 111 may be divided into stylus connection areas RGN1, RGN2, and RGN3. The driving circuit 112 enables the stylus connection areas RGN1 to RGN3 to detect the position of the stylus 120 one by one in a preset scan order during a discovery period. When the stylus 120 successfully establishes a connection with one of the stylus connection areas (a hit area), the first discovery period is ended to enter the normal period. In the operation scenario shown in FIG. 1, the stylus connection area RGN2 is the hit area. When the driving circuit 112 scans to the stylus connection area RGN2, the driving circuit 112 may detect the position of the stylus 120 (e.g., coordinates x, y) via the stylus connection area RGN2 of the touch panel 111. During the normal period, the driving circuit 112 enables the stylus connection area RGN2 (the hit area) to track the position of the stylus 120, and the driving circuit 112 disables the other stylus connection areas RGN1 and RGN3 (non-hit areas) to reduce power consumption. When the connection between the stylus 120 and the touch panel 111 is interrupted, the normal mode is ended to enter the discovery mode again to detect the position of the stylus 120 again.

Figure 2:
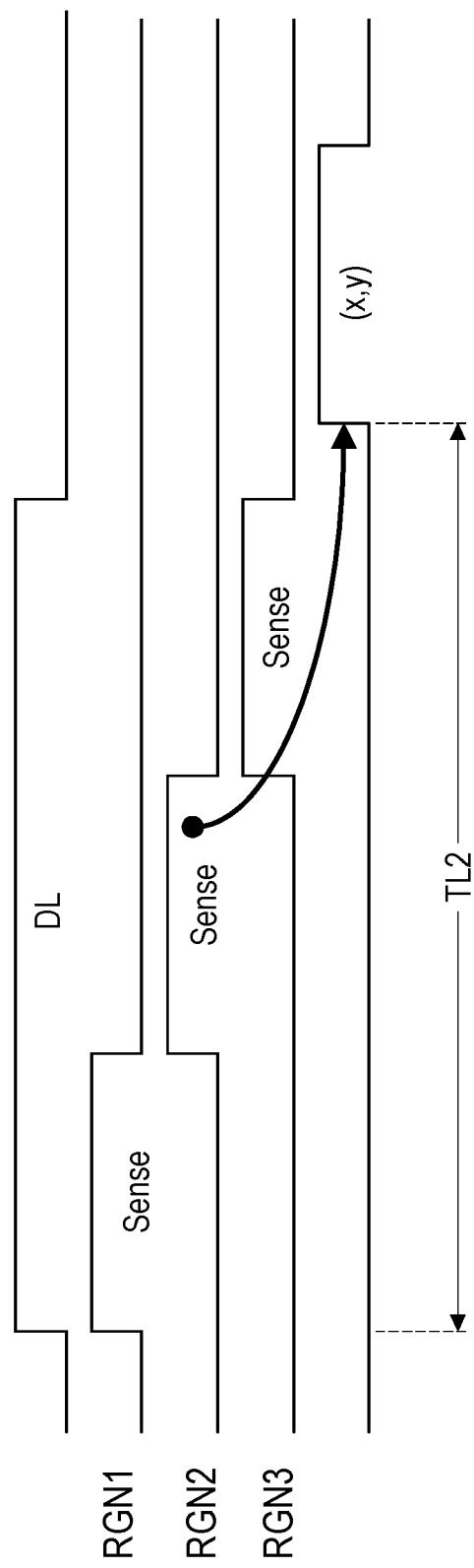
FIG. 2 is a schematic diagram of an operation sequence of a touch device shown according to an embodiment.

FIG. 2 is a schematic diagram of an operation sequence of the touch device 110 shown according to an embodiment. Please refer to FIG. 1 and FIG. 2. During the period when the stylus 120 sends the downlink signal DL, the driving circuit 112 enables the stylus connection areas RGN1 to RGN3 to detect the stylus 120 at different times in a preset scan order. Based on the operation scenario shown in FIG. 1 in which the stylus connection area RGN2 is the hit area, the driving circuit 112 detects the presence of the stylus 120 only when the stylus connection area RGN2 is enabled, thus causing the presence of a latency TL2, and thus readily causing the issue of poor sensitivity when the user draws a line quickly.

Figure 3:
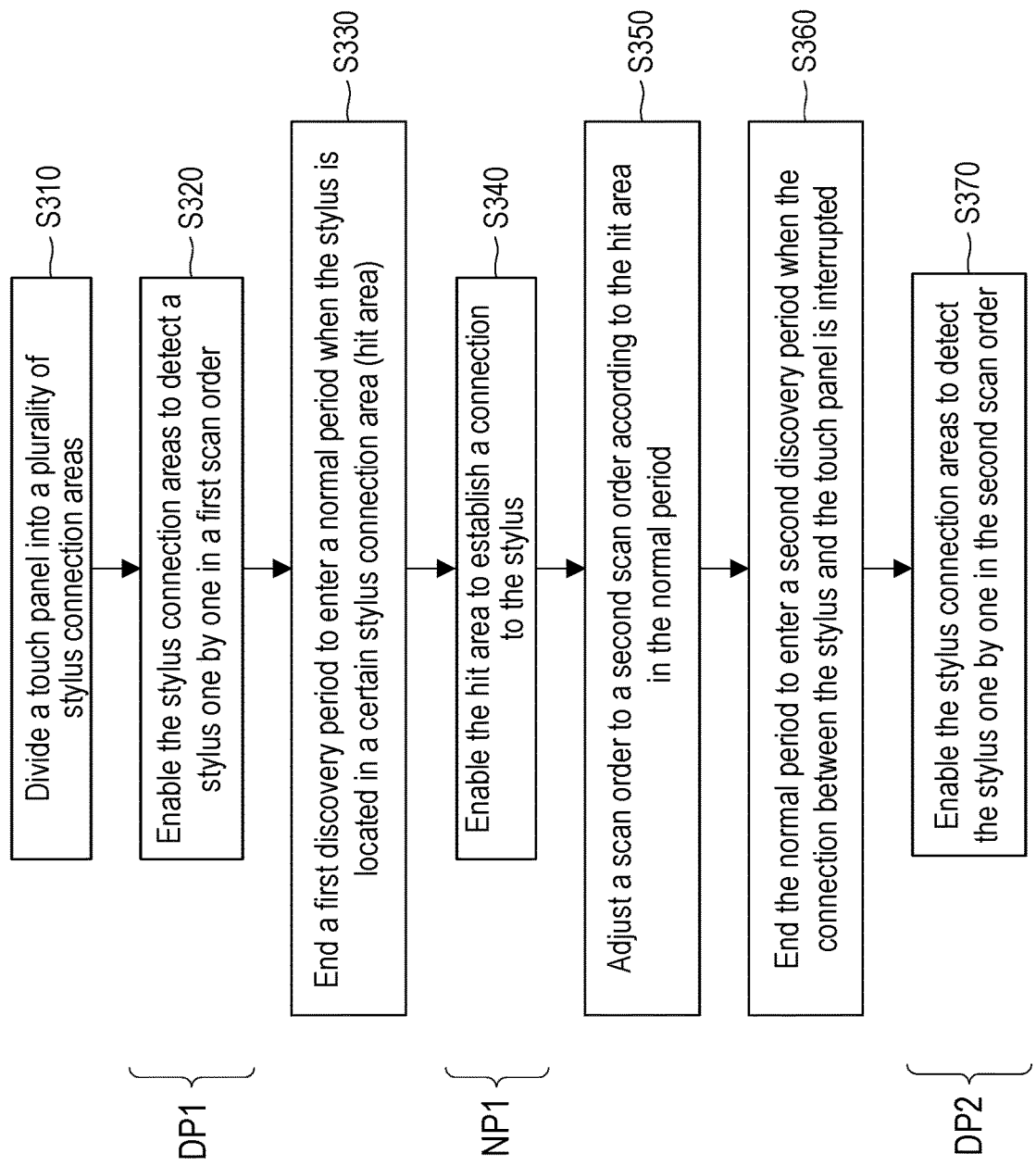
FIG. 3 is a schematic diagram of the flowchart of an operation method of a touch device shown according to an embodiment of the disclosure.

FIG. 3 is a schematic diagram of the flowchart of an operation method of a touch device shown according to an embodiment of the disclosure. Please refer to FIG. 1 and FIG. 3. In step S310, the touch panel 111 is divided into a plurality of stylus connection areas. Although the touch panel 111 shown in FIG. 1 may be divided into the stylus connection areas RGN1, RGN2, and RGN3, the actual number of stylus connection areas of the touch panel 111 may be determined according to actual design. The driving circuit 112 is coupled to the touch panel 111. The driving circuit 112 enables the stylus connection areas RGN1 to RGN3 one by one in the first scan order during a first discovery period DP1 (step S320), so as to detect the position of the stylus 120 at the touch panel 111. When the stylus 120 is located in a certain area (the hit area) among the stylus connection areas RGN1 to RGN3, the first discovery period DP1 is ended to enter a normal period NP1 (step S330). For example, in the first discovery period DP1, once the driving circuit 112 detects the position of the stylus 120 at the touch panel 111, regardless of whether the first scan order is completed, the driving circuit 112 may immediately stop the first discovery period DP1 to enter the normal period NP1.

During the normal period NP1, the driving circuit 112 enables the hit area (such as the stylus connection area RGN2 shown in FIG. 1) to establish a connection to the stylus 120 (step S340), and tracks the position of the stylus 120. According to actual design, the driving circuit 112 may use any method to track the position of the stylus 120. For example, the driving circuit 112 may track the position of the stylus 120 using a known technique or other methods.

During the normal period NP1, when the driving circuit 112 enables the hit area to establish the connection to the stylus 120, the driving circuit 112 may disable non-hit areas (e.g., the stylus connection areas RGN1 and RGN3 shown in FIG. 1) to reduce power consumption.

In step S350, the driving circuit 112 may adjust the first scan order to a second scan order according to the hit area (e.g., the stylus connection area RGN2 shown in FIG. 1) establishing the connection to the stylus 120 in the normal period NP1. When the connection between the stylus 120 and the touch panel 111 is interrupted, the normal period NP1 is ended to enter a second discovery period DP2 (step S360). Based on actual design, in some embodiments, step S350 may be performed in the normal period NP1. In some other embodiments, step S350 may be performed after the normal period NP1 is ended.

Based on the movement of the stylus 120 at the surface of the touch panel 111, there may be different hit areas at different time points in the normal period NP1. The driving circuit 112 may adjust the first scan order to the second scan order according to one or a plurality of the hit areas. For example (but not limited thereto), the driving circuit 112 may adjust the first scan order to the second scan order according to the last hit area establishing the connection to the stylus 120 among the stylus connection areas of the touch panel 111 at the end of the normal period NP1. The last hit area is a top priority scan position in the second scan order, and in the stylus connection areas of the touch panel 111, one adjacent area adjacent to the last hit area is a second priority scan order in the second scan order.

The driving circuit 112 may adjust the first scan order to the second scan order according to the hit area in the normal period NP1. In step S370, the driving circuit 112 may enable the stylus connection areas RGN1 to RGN3 one by one in the second scan order during the second discovery period DP2, so as to detect the position of the stylus 120 at the touch panel 111. Since the second scan order is related to the hit area in the normal period NP1, the driving circuit 112 may quickly detect the position of the stylus 120 on the touch panel 111 again. In the second discovery period DP2, once the driving circuit 112 detects the position of the stylus 120 at the touch panel 111, regardless of whether the second scan order is completed, the driving circuit 112 may immediately stop the second discovery period DP2 to enter the normal period.

For example, it is assumed that the first scan order is "RGN1→RGN2→RGN3", that is, the enabling order of the driving circuit 112 to the stylus connection areas RGN1 to RGN3 in the first discovery period DP1 is "RGN1→RGN2→RGN3→RGN1→RGN2→RGN3→ . . . ", until the position of the stylus 120 on the touch panel 111 is detected. It is assumed that the last hit area at the end of the normal period NP1 is the stylus connection area RGN2. The driving circuit 112 may set the last hit area as the top priority scan position in the second scan order. For example, the second scan order of the second discovery period DP2 may be adjusted as "RGN2→RGN1→RGN3". That is, the enabling order of the driving circuit 112 to the stylus connection areas RGN1 to RGN3 in the second discovery period DP2 is "RGN2→RGN1→RGN3→RGN2→RGN1→RGN3→ . . . ", until the position of the stylus 120 on the touch panel 111 is detected. Generally speaking, the probability of the stylus 120 returning to the last hit area is greater than the probability of the stylus 120 going to other stylus connection areas. Prioritizing (scanning) the last hit area RGN2 may effectively reduce the latency of detecting the active pen again.

In other embodiments, the driving circuit 112 may determine the second scan order using different methods. For example, the driving circuit 112 may adjust the weight of each of the stylus connection areas RGN1 to RGN3 according to the hit area (e.g., the stylus connection area RGN2 shown in FIG. 1) establishing the connection to the stylus 120 in the normal period NP1, and then adjust the first scan order to the second scan order according to these weights. As an example, one stylus connection area having the largest weight in the stylus connection areas RGN1 to RGN3 is the top priority scan position in the second scan order, and one stylus connection area having the second largest weight in the stylus connection areas RGN1 to RGN3 is the second priority scan position in the second scan order. According to actual design, different embodiments may have different methods for adjusting weights. A plurality of weight adjustment methods are exemplarily described below.

In some embodiments, the driving circuit 112 may increase the weight of the last hit area (e.g., the stylus connection area RGN2 shown in FIG. 1) establishing the connection to the stylus 120 in the stylus connection areas RGN1 to RGN3 at the end of the normal period NP1. In some other embodiments, the driving circuit 112 may reduce the weights of the non-hit areas (such as the stylus connection areas RGN1 and RGN3 shown in FIG. 1) other than the last hit area. In some other embodiments, the driving circuit 112 may increase the weight of the last hit area (such as the stylus connection area RGN2 shown in FIG. 1) at the end of the normal period NP1, and reduce the weight of the non-hit areas (such as the stylus connection areas RGN1 and RGN3 shown in FIG. 1) other than the last hit area.

Table 1 below shows one specific example of weight adjustment, including the weights and scan orders in different discovery periods DP1 to DP6. W1, W2, and W3 shown in Table 1 represent the weights of the stylus connection areas RGN1 to RGN3 respectively. The weights W1 to W3 of the stylus connection areas RGN1 to RGN3 in the discovery period DP1 are assumed to be an initial value "1", and the scan order of the discovery period DP1 is assumed to be "RGN1→RGN2→RGN3".

TABLE 1

Examples of weight adjustments

|  | DP1 | DP2 | DP3 | DP4 | DP5 | DP6 |
|---|---|---|---|---|---|---|
| W1 | 1 | 2 | 3 | 2 | 1 | 1 |
| W2 | 1 | 1 | 1 | 2 | 3 | 2 |
| W3 | 1 | 1 | 1 | 1 | 1 | 2 |
| Scan order | RGN1 | RGN1 | RGN1 | RGN1 | RGN2 | RGN2 |
|  | RGN2 | RGN2 | RGN2 | RGN2 | RGN1 | RGN3 |
|  | RGN3 | RGN1 | RGN1 | RGN1 | RGN2 | RGN2 |
|  |  | RGN3 | RGN3 | RGN2 | RGN3 | RGN3 |
|  |  |  | RGN1 | RGN3 | RGN2 | RGN1 |

It is assumed that at the end of the normal period between the discovery periods DP1 and DP2, the last hit area is the stylus connection area RGN1. Accordingly, the driving circuit 112 may increase the weight W1 of the last hit area RGN1 and reduce the weights W2 and W3 of the non-hit areas RGN2 and RGN3. In the present embodiment, when the weight is reduced to less than 1, the weight less than 1 is reset to the initial value "1". The driving circuit 112 may determine the number of times each of the stylus connection areas RGN1 to RGN3 is scanned in the scan order according to the adjusted weights W1 to W3. As shown in Table 1, the weights W1 to W3 corresponding to the discovery period DP2 are "2", "1", and "1" respectively. Therefore, in the scan order of the discovery period DP2, the stylus connection area RGN1 may be enabled (scanned) twice, and the stylus connection areas RGN2 and RGN3 are each enabled (scanned) once. In addition, one stylus connection area having the largest weight in the stylus connection areas RGN1 to RGN3 is the top priority scan position in the scan order. As shown in Table 1, the stylus connection area RGN1 having the largest weight "2" is the top priority scan position in the scan order of the discovery period DP2.

It is assumed that at the end of the normal period between the discovery periods DP2 and DP3, the last hit area is still the stylus connection area RGN1. Accordingly, the driving circuit 112 may increase the weight W1 of the last hit area RGN1 again and reduce the weights W2 and W3 of the non-hit areas RGN2 and RGN3. As shown in Table 1, the weights W1 to W3 corresponding to the discovery period DP3 are "3", "1", and "1", respectively. Therefore, the stylus connection area RGN1 may be enabled (scanned) three times in the scan order of the discovery period DP3, and the stylus connection areas RGN2 and RGN3 are each enabled (scanned) once. Moreover, the stylus connection area RGN1 having the largest weight "3" is the top priority scan position in the scan order of the discovery period DP3.

It is assumed that at the end of the normal period between the discovery periods DP3 and DP4, the last hit area is the stylus connection area RGN2. Accordingly, the driving circuit 112 may increase the weight W2 of the last hit area RGN2 and reduce the weights W1 and W3 of the non-hit areas RGN1 and RGN3. As shown in Table 1, the weights W1 to W3 corresponding to the discovery period DP4 are "2", "2", and "1", respectively. Therefore, the stylus connection areas RGN1 and RGN2 may each be enabled (scanned) twice in the scan order of the discovery period DP4, and the stylus connection areas RGN3 is enabled (scanned) once. Moreover, the stylus connection areas RGN1 and RGN2 having the largest weight "2" are respectively the top priority scan position and the second priority scan position in the scan order of the discovery period DP4.

It is assumed that at the end of the normal period between the discovery periods DP4 and DP5, the last hit area is still the stylus connection area RGN2. Accordingly, the driving circuit 112 may increase the weight W2 of the last hit area RGN2 and reduce the weights W1 and W3 of the non-hit areas RGN1 and RGN3. As shown in Table 1, the weights W1 to W3 corresponding to the discovery period DP5 are "1", "3", and "1", respectively. Therefore, the stylus connection area RGN2 may be enabled (scanned) three times in the scan order of the discovery period DP5, and the stylus connection areas RGN1 and RGN3 are each enabled (scanned) once. Moreover, the stylus connection area RGN2 having the largest weight "3" is the top priority scan position in the scan order of the discovery period DP5.

It is assumed that at the end of the normal period between the discovery periods DP5 and DP6, the last hit area is the stylus connection area RGN3. Accordingly, the driving circuit 112 may increase the weight W3 of the last hit area RGN3 and reduce the weights W1 and W2 of the non-hit areas RGN1 and RGN2. As shown in Table 1, the weights W1 to W3 corresponding to the discovery period DP6 are "1", "2", and "2", respectively. Therefore, the stylus connection areas RGN2 and RGN3 may each be enabled (scanned) twice in the scan order of the discovery period DP6, and the stylus connection areas RGN1 is enabled (scanned) once. Moreover, the stylus connection areas RGN2 and RGN3 having the largest weight "2" are respectively the top priority scan position and the second priority scan position in the scan order of the discovery period DP6.

Figure 4:
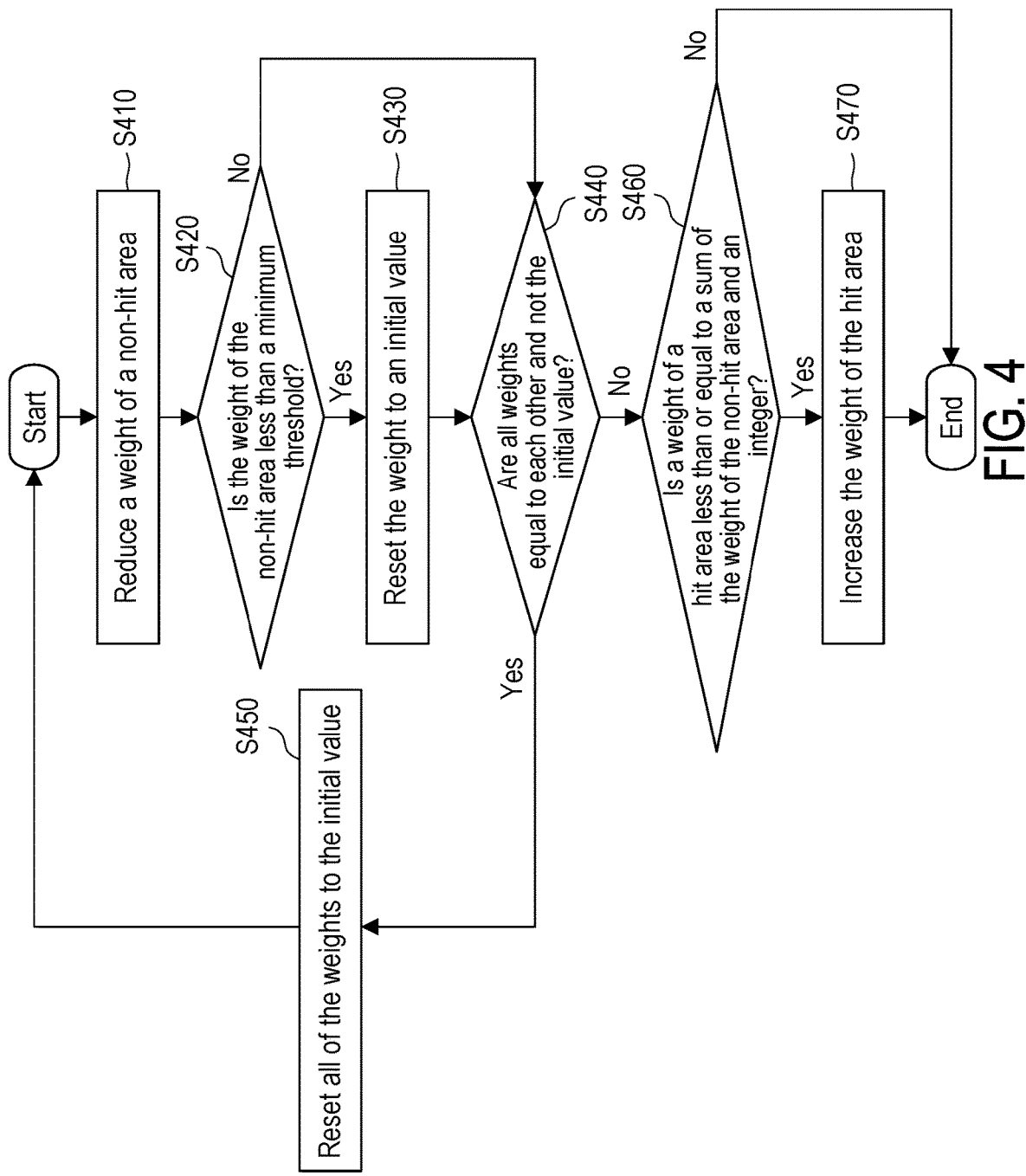
FIG. 4 is a schematic flowchart of a weight adjustment method shown according to an embodiment of the disclosure.

FIG. 4 is a schematic flowchart of a weight adjustment method shown according to an embodiment of the disclosure. Please refer to FIG. 1 and FIG. 4. In step S410, the driving circuit 112 may reduce the weight of the non-hit area (e.g., W(non-hit)=W(non-hit)−1). In step S420, the driving circuit 112 may check whether the weight of the non-hit area reaches a minimum threshold. The minimum threshold may be set according to actual design. For example, the minimum threshold may be "1" or other values. When the weight of the non-hit area does not reach the minimum threshold (the determination result of step S420 is "No"), the driving circuit 112 may proceed to step S440. When the weight of the non-hit area reaches the minimum threshold (the determination result of step S420 is "Yes"), the driving circuit 112 may reset the weight of the non-hit area to an initial value (step S430), and then proceed to step S440. The initial value may be set according to actual design. For example, the initial value may be "1" or other values.

In step S440, the driving circuit 112 may check whether all of the weights are equal to each other and are not the initial value. When the weights of all of the stylus connection areas are not the initial value and the weights of all of the stylus connection areas are equal to each other (the determination result of step S440 is "Yes"), the driving circuit 112 may reset the weights of all of the stylus connection areas to the initial value (step S450). When the weights of all of the stylus connection areas are not equal to each other, or when all of the weights are equal to each other and are the initial value (the determination result of step S440 is "No"), the driving circuit 112 may proceed to step S460.

In step S460, the driving circuit 112 may check whether the weight of the hit area is less than or equal to the sum of the weights of all of the non-hit areas and an integer. The integer may be set according to actual design. For example, the integer may be "1" or other values. When the weight of the last hit area is less than or equal to the sum of the weights of all of the non-hit areas and the integer (the determination result of step S460 is "Yes"), the driving circuit 112 may increase the weight of the last hit area (step S470).

The driving circuit 112 may determine the number of times each of the stylus connection areas is scanned in the scan order according to the adjusted weights. In addition, one stylus connection area having the largest weight in the stylus connection areas is the top priority scan position in the scan order.

Based on the above, in order to reduce the power consumption generated during the connection between the touch panel 111 and the stylus 120, the touch panel 111 of the touch device 110 may be divided into the plurality of stylus connection areas (e.g., RGN1 to RGN3) to perform local scan. The driving circuit 112 enables the stylus connection areas RGN1 to RGN3 one by one in the first scan order to detect the position of the stylus 120 during the first discovery period. When the stylus 120 successfully establishes a connection with a certain stylus connection area (a hit area), the first discovery period is ended to enter the normal period. During the normal period, the driving circuit 112 enables the hit area (for example, the stylus connection area RGN2) to track the position of the stylus 120, and the driving circuit 112 disables the other stylus connection areas (non-hit areas) to reduce power consumption. The driving circuit 112 may adjust the first scan order to the second scan order according to the hit area in the normal period. When the connection between the stylus 120 and the touch panel 111 is interrupted, the normal period is ended to enter the second discovery period to detect the position of the stylus 120 again. The driving circuit 112 enables the stylus connection areas RGN1 to RGN3 one by one in the second scan order to detect the position of the stylus 120 at the touch panel 111 during the second discovery period. Since the second scan order is related to the hit area in the normal period, the driving circuit 112 may quickly detect the position of the stylus 120 on the touch panel 111 again.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A touch device, comprising:
   a touch panel divided into a plurality of stylus connection areas; and
   a driving circuit coupled to the touch panel, wherein,
   the driving circuit enables the stylus connection areas one by one in a first scan order to detect a position of a stylus at the touch panel during a first discovery period;
   when the stylus is located in a hit area among the stylus connection areas, the first discovery period is ended to enter a normal period, and the driving circuit enables the hit area to establish a connection to the stylus;
   the driving circuit adjusts the first scan order to a second scan order according to the hit area establishing the connection to the stylus during the normal period;
   when the connection between the stylus and the touch panel is interrupted, the normal period is ended to enter a second discovery period; and
   the driving circuit enables the stylus connection areas one by one in the second scan order to detect the position of the stylus at the touch panel during the second discovery period.

2. The touch device of claim 1, wherein when the driving circuit enables the hit area to establish the connection to the stylus, the driving circuit disables at least one non-hit area among the stylus connection areas to reduce a power consumption.

3. The touch device of claim 1, wherein during the first discovery period or the second discovery period, once the driving circuit detects the stylus is at the position of the touch panel, regardless of whether the first scan order or the second scan order is completed, the driving circuit immediately stops the first discovery period or the second discovery period to enter the normal period.

4. The touch device of claim 1, wherein the driving circuit adjusts the first scan order to the second scan order according to a last hit area among the stylus connection areas establishing the connection to the stylus at an end of the normal period.

5. The touch device of claim 4, wherein the last hit area is a top priority scan position in the second scan order, and an adjacent area adjacent to the last hit area among the stylus connection areas is a second priority scan position in the second scan order.

6. The touch device of claim 1, wherein the driving circuit adjusts a weight of each of the stylus connection areas according to the hit area establishing the connection to the stylus during the normal period, and the first scan order is adjusted to the second scan order according to the weights.

7. The touch device of claim 6, wherein a first stylus connection area having a maximum weight in the stylus connection areas is a top priority scan position in the second scan order, and a second stylus connection area having a second largest weight in the stylus connection areas is a second priority scan position in the second scan order.

8. The touch device of claim 6, wherein a method of adjusting the weights via the driving circuit comprises:
   increasing the weight of a last hit area among the stylus connection areas establishing the connection to the stylus at an end of the normal period via the driving circuit; or
   reducing the weight of at least one non-hit area among the stylus connection areas other than the last hit area via the driving circuit.

9. The touch device of claim 8, wherein the method of adjusting the weights via the driving circuit further comprises:
   resetting the weight of the at least one non-hit area to an initial value via the driving circuit when the weight of the at least one non-hit area reaches a minimum threshold.

10. The touch device of claim 8, wherein the method of adjusting the weights via the driving circuit further comprises:
    resetting the weights of the stylus connection areas to an initial value via the driving circuit when the weights of the stylus connection areas are not the initial value and the weights of the stylus connection areas are equal to each other.

11. The touch device of claim 8, wherein the method of adjusting the weights via the driving circuit further comprises:
    increasing the weight of the last hit area via the driving circuit when the weight of the last hit area is less than or equal to a sum of the weight of the at least one non-hit area and an integer.

12. The touch device of claim 8, wherein the method of adjusting the weights via the driving circuit further comprises:
    determining a number of times each of the stylus connection areas is scanned in the second scan order according to the weights via the driving circuit.

13. The touch device of claim 12, wherein a first stylus connection area having a maximum weight in the stylus connection areas is a top priority scan position in the second scan order.

14. An operation method of a touch device, comprising:
    dividing a touch panel of the touch device into a plurality of stylus connection areas;
    enabling the stylus connection areas one by one in a first scan order to detect a position of a stylus at the touch panel during a first discovery period;
    ending the first discovery period to enter a normal period and enabling a hit area to establish a connection to the stylus when the stylus is located in the hit area among the stylus connection areas;
    adjusting the first scan order to a second scan order according to the hit area establishing the connection to the stylus during the normal period;
    ending the normal period to enter a second discovery period when the connection between the stylus and the touch panel is interrupted; and
    enabling the stylus connection areas one by one in the second scan order to detect the position of the stylus at the touch panel during the second discovery period.

15. The operation method of claim 14, further comprising:
disabling at least one non-hit area among the stylus connection areas to reduce a power consumption when the hit area is enabled to establish the connection to the stylus.

16. The operation method of claim 14, further comprising:
immediately stopping the first discovery period or the second discovery period to enter the normal period regardless of whether the first scan order or the second scan order is completed once the position of the stylus at the touch panel is detected during the first discovery period or the second discovery period.

17. The operation method of claim 14, further comprising:
adjusting the first scan order to the second scan order according to a last hit area among the stylus connection areas establishing the connection to the stylus at an end of the normal period.

18. The operation method of claim 17, wherein the last hit area is a top priority scan position in the second scan order, and an adjacent area adjacent to the last hit area among the stylus connection areas is a second priority scan position in the second scan order.

19. The operation method of claim 14, further comprising:
adjusting a weight of each of the stylus connection areas according to the hit area establishing the connection to the stylus during the normal period; and
adjusting the first scan order to the second scan order according to the weights.

20. The operation method of claim 19, wherein a first stylus connection area having a maximum weight in the stylus connection areas is a top priority scan position in the second scan order, and a second stylus connection area having a second largest weight in the stylus connection areas is a second priority scan position in the second scan order.

21. The operation method of claim 19, further comprising:
increasing the weight of a last hit area among the stylus connection areas establishing the connection to the stylus at an end of the normal period; or
reducing the weight of at least one non-hit area among the stylus connection areas other than the last hit area.

22. The operation method of claim 21, further comprising:
resetting the weight of the at least one non-hit area to an initial value when the weight of the at least one non-hit area reaches a minimum threshold.

23. The operation method of claim 21, further comprising:
resetting the weights of the stylus connection areas to an initial value when the weights of the stylus connection areas are not the initial value and the weights of the stylus connection areas are equal to each other.

24. The operation method of claim 21, further comprising:
increasing the weight of the last hit area when the weight of the last hit area is less than or equal to a sum of the weight of the at least one non-hit area and an integer.

25. The operation method of claim 21, further comprising:
determining a number of times each of the stylus connection areas is scanned in the second scan order according to the weights.

26. The operation method of claim 25, wherein a first stylus connection area having a maximum weight in the stylus connection areas is a top priority scan position in the second scan order.

* * * * *